United States Patent [19]

Yamada et al.

[11] Patent Number: 4,705,941
[45] Date of Patent: Nov. 10, 1987

[54] APPARATUS FOR DETECTING A FOCUSING STATE OF AN OPTICAL SYSTEM

[75] Inventors: Hisashi Yamada, Yokohama; Seiichi Ohgoshi, Hiratsuka, both of Japan

[73] Assignee: Kabushiki Kaisha Toshiba, Kawasaki, Japan

[21] Appl. No.: 625,609

[22] Filed: Jun. 28, 1984

[30] Foreign Application Priority Data

Jun. 30, 1983 [JP] Japan ................................ 58-119345
Dec. 5, 1983 [JP] Japan ................................ 58-228337

[51] Int. Cl.⁴ .............................................. G01J 1/36
[52] U.S. Cl. ...................................... 250/201; 250/204
[58] Field of Search ............. 250/201 R, 201 AF, 204

[56] References Cited

U.S. PATENT DOCUMENTS 4,370,551 1/1983 Fukuhara et al. ................. 250/204
4,521,680 6/1985 Ando ................................... 250/201

FOREIGN PATENT DOCUMENTS 0044074 1/1982 European Pat. Off. .
56-44126 4/1961 Japan .
54-4105 1/1979 Japan .
57-135326 8/1982 Japan .

OTHER PUBLICATIONS

Patent Abstracts of Japan, vol. 8, No. 97, May 8th, 1984, p. (P-272) (1534); and JP-A-59-8146 (Ricoh) 17-01-1984.
Patent Abstracts of Japan, vol. 4, No. 184, Dec. 18th, 1980, p. (P-41) (666); and JP-A-55-125547 (Matsushita) 27-09-1980.

*Primary Examiner*—Gene Wan
*Attorney, Agent, or Firm*—Oblon, Fisher, Spivak, McClelland, & Maier

[57] ABSTRACT

In an apparatus for detecting a focusing state of an optical system, a laser beam generated from a laser unit is transmitted through a beam splitter to a convergent lens. The laser beam is converged by the convergent lens and projected toward the surface of an optical disk. The laser beam reflected from the disk surface is reflected by the beam splitter and projected through the aperture of a light shielding plate to a photodetector. The photodetector has first and second photo sensitive regions arranged concentrically, and when the convergent lens is in a focusing state, the levels of the first and second photo signals from the first and second photo sensitive regions are equal to one another, and the output signal from the differential amplifier is maintained at zero level. When the convergent lens is approaches the focusing state from the position sufficiently separated from the optical disk, a positive output signal is generated from the differential amplifier. When the convergent lens gradually approaches from the position of the focusing state to the optical disk, the beam spot gradually becomes small on the photosensitive regions and again starts expanding, but the laser beam does not expand beyond a predetermined beam diameter on the photosensitive regions due to the light shielding plate. Therefore, the beam is retained at a predetermined value. Consequently, the output signal from the differential amplifier is not varied from the negative level to the positive level.

11 Claims, 17 Drawing Figures

F I G. 6
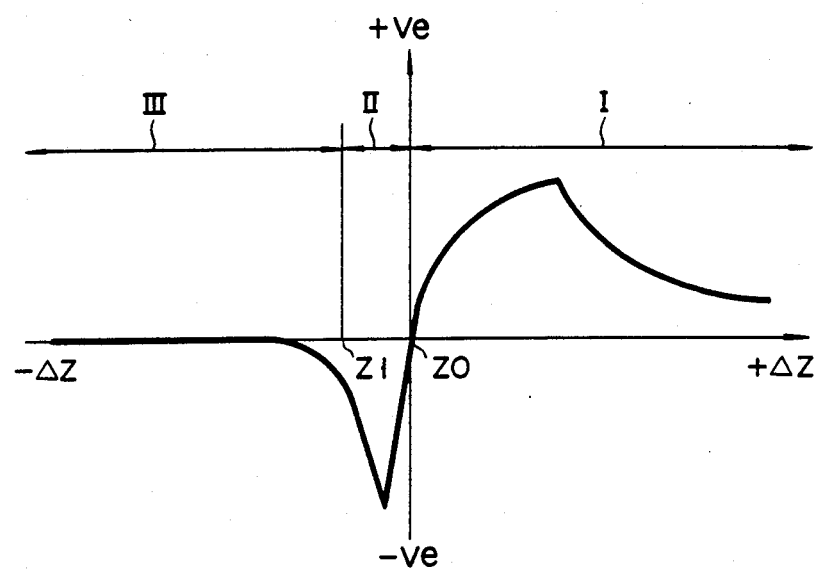
F I G. 7
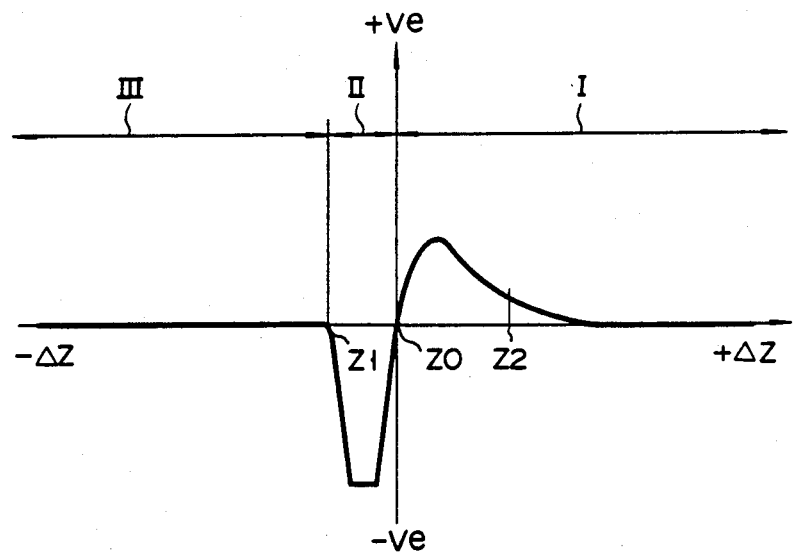

APPARATUS FOR DETECTING A FOCUSING STATE OF AN OPTICAL SYSTEM

BACKGROUND OF THE INVENTION

The present invention relates to an apparatus for detecting a focusing state of an optical system and, more particularly, to an apparatus for detecting a focusing state of a convergent lens for converging a laser beam to project the beam to a target surface such as the surface of an optical disk.

Various systems for projecting a laser beam to an optical disk, on which audio, video or another data or information is recorded in pits or another formation, to read out information or data are already known. In such systems, it is required to maintain a convergent lens in a focusing state, i.e., to locate the lens to always be separated by a predetermined distance, i.e., the focal length of the lens from the surface of an optical disk, and to form a beam waist spot on the surface of the optical disk. Therefore, in a system for reading out information or data, there is provided a focusing servo system which has an apparatus for detecting a focusing state and moves a convergent lens along the optical axis of the basis of an output signal from the apparatus to maintain the lens in a focusing state.

An apparatus shown in FIG. 1 is known as an example of an apparatus for detecting a focusing state. In the apparatus for detecting this focusing state, a laser beam reflected from the surface of the optical disk is directed toward a photodetector 2 having first and second photo sensitive regions 2-1 and 2-2 concentrically arranged, and a beam spot is formed on the photo sensitive regions 2-1 and 2-2. When the convergent lens is in a focusing state and a laser beam directed from the convergent lens toward the optical disk forms a beam waist spot on the optical disk, as shown in FIG. 2A, a beam spot 6-1 having a size shown in FIG. 2A is produced on the photo sensitive regions 2-1 and 2-2 of the photodetector 2, the levels of the photo signals respectively generated from the first and second photo sensitive regions 2-1 and 2-2 are equal to one another, and the level of the output signal from a differential amplifier 4 is maintained at substantially zero. When the convergent lens is deviated from the position of the focusing state in a direction away from the optical disk, the laser beam diverged, as compared with the laser beam shown in FIG. 2A, is directed toward the photodetector 2 as shown in FIG. 2B, and a larger beam spot 6-2 is formed on the photo sensitive regions 2-1 and 2-2 as compared with FIG. 2A. Accordingly, the level of the photo signal from the second photo sensitive region 2-2 becomes larger than that of the photo signal from the first photo sensitive region 2-2, and a positive output signal is supplied from the differential amplifier. When the convergent lens is, on the other hand, deviated from the position of the focusing state in a direction for approaching the optical disk, a laser beam converted as shown in FIG. 2C is directed toward the photodetector 2, and a smaller beam spot 6-3, as compared with FIG. 2A, is formed on the photosensitive regions 2-1 and 2-2. Consequently, the level of the photo signal from the second photo sensitive region 2-2 becomes smaller than that from the first photo sensitive region 2-2, and a negative output signal is supplied from the differential amplifier. In a conventional focusing state detecting apparatus, a convergent lens is moved along the optical axis in accordance with an output signal from a differential amplifier 4, and the lens is always maintained in a focusing state.

The conventional apparatus has a following problem. When the distance between a convergent lens and an optical disk is shorter than a predetermined value or when the lens exessively approaches the disk, a laser beam emitted to the photodetector 2, as shown in FIG. 2D, expands and become thicker than the laser beam shown in FIG. 2C. As a result, a relatively larger beam spot 6-4 is formed on the photosensitive regions 2-1, 2-2 as shown in FIG. 2D. Therefore, even if the lens is too close to the disk surface, a differential amplifier 4 generates signals similar to those which may be produced when the lens is at too long a distance from the disk surface. There is the risk that the convergent lens should further approach the disk surface. FIG. 3 shows a relationship between the level of the output signal from the differential amplifier 6 and a distance $\Delta Z$ deviated from the position when the convergent lens is in a focusing state. In FIG. 3, a range I shows the level of the output signal from the differential amplifier in the case when the convergent lens is deviated from the position of the focusing state in a direction away from the optical disk. Ranges II and III respectively show the levels of the output signals from the differential amplifier in the case when the convergent lens is deviated in a direction for approaching the optical disk from the position of the focusing state, and partioularly, range III shows the case when the level of the output signal of the differential amplifier becomes positive, irrespective of the case when the convergent lens approaches the optical disk within a predetermined distance from the position of the focusing state. As apparent from FIG. 3, in range III, the convergent lens cannot be located in the focusing state by the output signal from the differential amplifier. Particularly, in a system for optically reading out information, the convergent lens might be located within range III due to a disturbance, such as a vibration, and might collide with the disk surface in the worst case.

SUMMARY OF THE INVENTION

It is an object of the present invention to provide an apparatus for detecting a defocusing state of an optical system and capable of preventing an erroneous detection in the case when a convergent lens excessively approaches a target surface.

In an apparatus for detecting a focusing state of the optical system of the present invention, an aperture is located in the optical path of a reflected light beam between a convergent lens for projecting a converged light beam to the target surface and a photodetector for detecting the light beam reflected from the target surface. Therefore, even if the diameter of a light beam directed toward the photodetector increases when the convergent lens excessively approaches the target surface, part of the light beam is stopped from passing by the aperture, and a relatively large beam spot, as in the case when the convergent lens is excessively separated from the target surface, is not formed on the photosensitive regions of the photodetector. As a result, the erroneous detection in the case when the convergent lens excessively approaches the target surface can be prevented.

BRIEF DESCRIPTION OF THE DRAWINGS

FIG. 6 shows the relationship between the level of an output signal from the differential amplifier shown in FIG. 4 and a distance ΔZ deviated by the convergent lens from the position of the focusing state;

FIG. 7 shows the relationship between the level of an output signal from a differential amplifier of an apparatus for detecting a focusing state of an optical system according to a modified embodiment of the present invention and a distance ΔZ deviated by the convergent lens from the position of the focusing state;

DETAILED DESCRIPTION OF THE PREFERRED EMBODIMENTS

Figure 4:
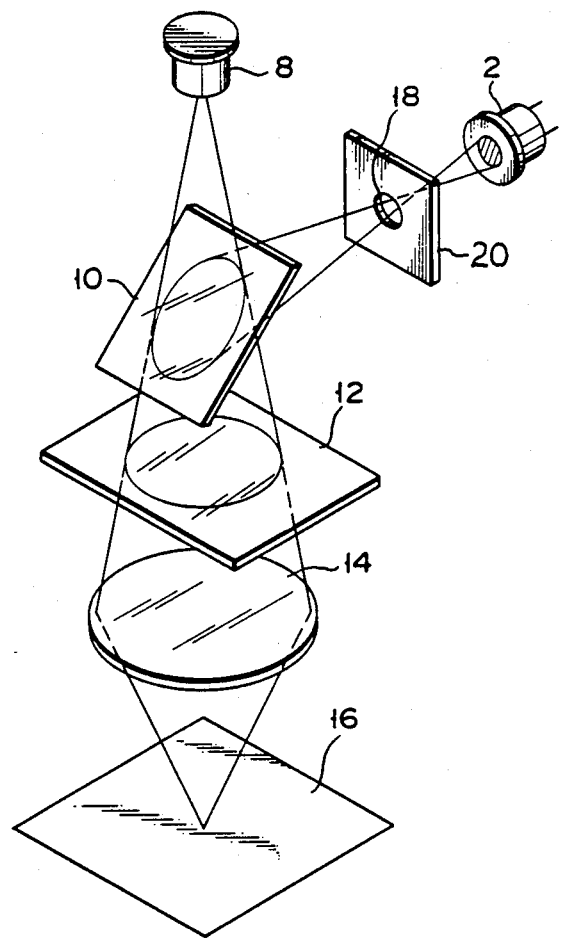
FIG. 4 schematically shows an embodiment of an apparatus for detecting a focusing state of an optical system according to the present invention.

In an apparatus for detecting a focusing state of an optical system according to the embodiment of the present invention shown in FIG. 4, a laser beam emitted from a laser unit 8 is transferred through a beam splitter 10 and a ¼λ plate 12 to a convergent lens or objective lens 14. This laser beam is converted by the convergent lens and projected to the surface 16 of an optical disk. When the convergent lens 14 is in a focusing, state, the beam waist of the laser beam converged by the convergent lens 14 is projected on the disk surface 16, and a minimum beam spot is formed on the disk surface 16. When the convergent lens 14 is disposed in an out-of-focus or defocusing state and deviated from the position of the focusing state in a direction for separating from the optical disk, the converted laser beam is projected on the disk surface 16 after a beam waste is formed. Therefore, a beam spot larger than the minimum beam spot is formed on the disk surface 16. Similarly, when the convergent lens 14 is disposed in an out-of-focus or defocusing state and deviated from the position of the focusing state in a direction for approaching the optical disk, the converged laser beam is projected to the disk surface 16 before a beam waist is formed, reflected on the disk surface 16, and then the beam waist is formed. Consequently, even in such a defocusing state, the beam spot larger than the minimum beam spot is formed on the disk surface.

Figure 1:
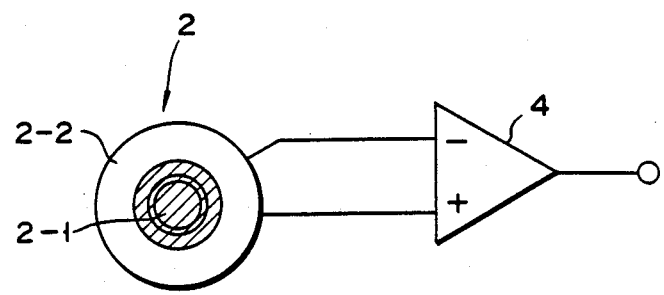
FIG. 1 is a block diagram showing a conventional apparatus for detecting a defocusing state of an optical system.
Figure 2A:
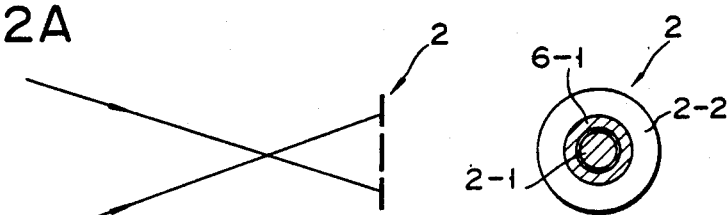
FIG. 2A to FIG. 2D show the relationship between the locuses of light rays in the case when a convergent lens, in an apparatus for detecting a defocusing state of the optical system shown in FIG. 1, is in the focusing state and defocusing state and a beam spot formed on the photosensitive regions of a photodetector.
Figure 2B:
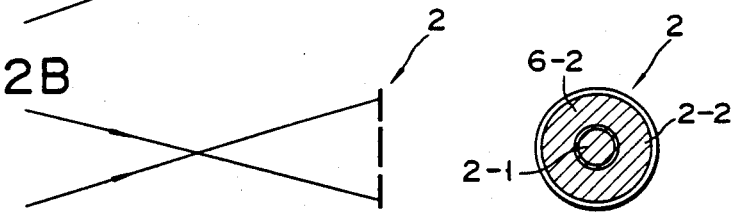
Figure 2C:
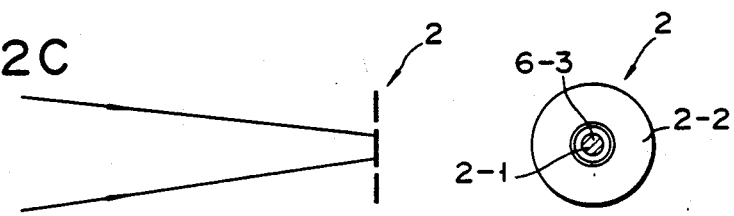
Figure 2D:
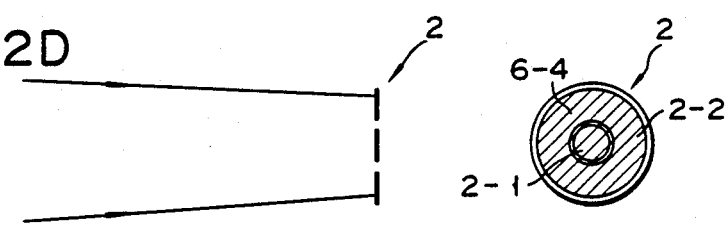
Figure 3:
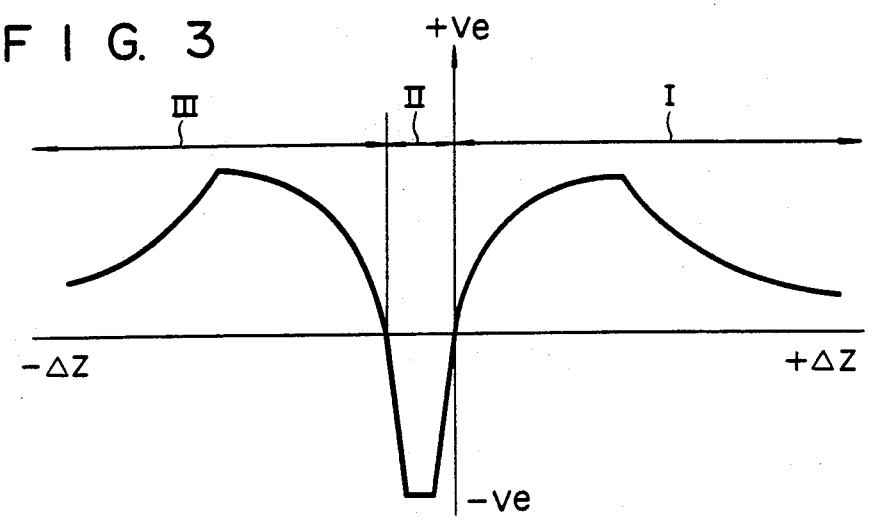
FIG. 3 shows the relationship between the level of an output signal from the differential amplifier shown in FIG. 1 and a distance ΔZ deviated from the position of the focusing state.

A laser beam reflected from the disk surface is again incident on a beam splitter 10 through the convergent lens 14 and the ¼λ plate 12. The laser beam is reciprocatedly passed in the ¼λ plate 12, thereby allowing its polarization plane to rotate. The laser beam is accordingly reflected by the beam splitter 10 and directed toward the photodetector 2 as shown in FIG. 4 through the plate 10 having an aperture 18. This photodetector 2 has first and second photo sensitive regions 2-1 and 2-2 concentrically arranged similarly to that incorporated in the conventional apparatus. Further, the photo sensitive regions 2-1 and 2-2 are connected to the differential amplifier 4 as also shown in FIG. 1, and the differential output is supplied from the differential amplifier 4 to a focus servo system (not shown).

In the apparatus shown in FIG. 4, the photo sensitive regions of the photodetector 2 are located at the rear convergent point for converging the laser beam reflected from the disk surface when the convergent lens 14 is in a focusing state, and the aperture 18 is located at the front convergent point, and both are arranged substantially symmetrically to the convergent point.

Figure 5A:
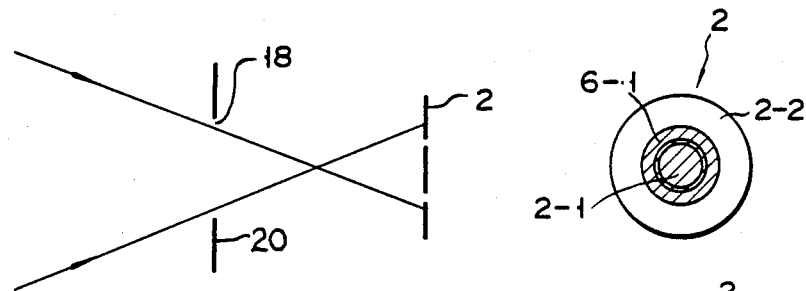
FIG. 5A to FIG. 5D show the relationship between the locuses of light rays in the case when a convergent lens, in an apparatus for detecting a defocusing state of the optical system shown in FIG. 4, is in the focusing state and defocusing state and a beam spot formed on the photosensitive regions of a photodetector.
Figure 5B:
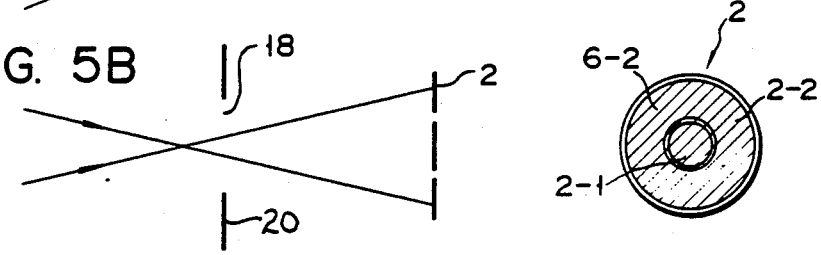
Figure 5C:
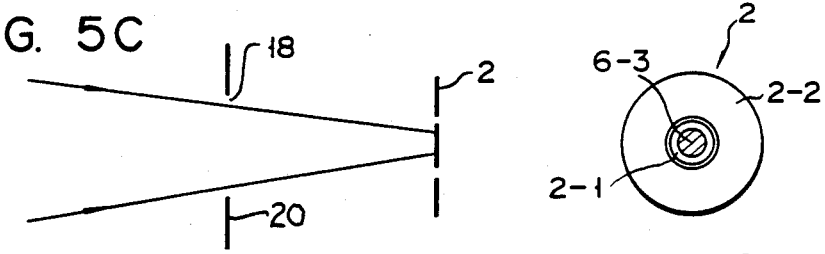
Figure 5D:
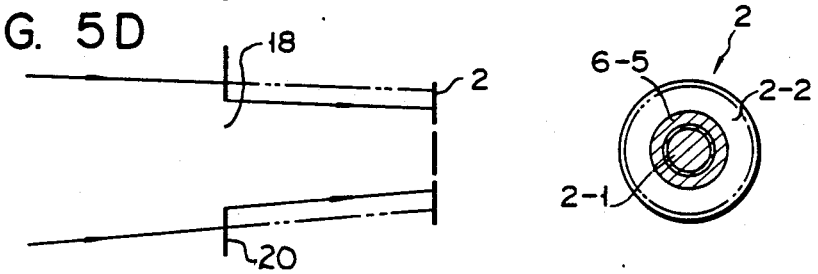

In the apparatus shown in FIG. 4, the laser beam is in a focusing state as shown in FIG. 5A. When the laser beam, directed from the convergent lens toward the optical disk, forms a beam waist spot on the optical disk, a beam spot 6-1 having a size as shown in FIG. 5A produces a substantially uniform area on the photo sensitive regions 2-1 and 2-2 of the photodetector 2, photo signals Va and Vb of equal level are respectively generated from the first and second photo sensitive regions 2-1 and 2-2, and the level of the output signal Ve from the differential amplifier 4 is maintained at substantially zero. When the convergent lens is deviated from the position of the focusing state in a direction away from the optical disk, the laser beam, diverged as co- mared with the laser beam shown in FIG. 5A, is directed toward the photodetector 2 as shown in FIG. 5B, a larger beam spot 6-2, as compared with FIG. 5A, is formed on the photo sensitive regions 2-1 and 2-2. Therefore, the photo signal Vb from the second photo sensitive region 2-2 increases its level as compared to the photo signal Va from the first photo sensitive region 2-2, and the positive output signal Ve is supplied from the differential amplifier 4 as shown by the range I in FIG. 6. When the convergent lens is, on the other hand, deviated from the position of the focusing state in a direction for approaching the optical disk, the laser beam converted as shown in FIG. 5C is directed toward the photodetector 2, and a smaller beam spot 6-3 as compared with FIG. 5A is formed on the photosensitive regions 2-1 and 2-2. Therefore, the photo signal Vb from the second photosensitive region 2-2 becomes a lower level as compared with the photo signal Va from the first photo sensitive region 2-2, and a negative output signal Ve is supplied from the differential amplifier as shown in the range II in FIG. 6. When the convergent lens excessively approaches the optical disk surface as compared with a predetermined distance, the laser beam directed toward the photodetector 2, as shown in FIG. 5D, is expanded as compared with the laser beam shown in FIG. 5C. However, part of the expanded laser beam is limited by a plate 20 formed with an aperture 18, with the result that a beam spot 6-5 smaller than the beam spot 6-1 shown in FIG. 5A is formed on the photosensitive regions 2-1 and 2-2. Consequently, even when the convergent lens excessively approaches the disk surface, a positive output signal similar to that of the convergent lens excessively separated from the disk surface is not generated from the differential amplifier 4, the output signal Ve with a substantially zero level is generated, and the convergent lens is prevented from approaching the disk surface. In the focusing state detecting apparatus of the present invention, the convergent lens is moved along its optical axis in accordance with the output signal from the differential amplifier 4, and always maintained in a focusing state. In addition, even when the convergent lens excessively approaches the disk surface, the convergent lens is prevented from running away.

In the embodiment described above, the outer diameter of the second photo sensitive region 2-2 is preferably limited within 2Wo of the beam spot 6-1 formed on the photo sensitive regions 2-1, 2-2 when the convergent lens is in a focusing state. Therefore, the photo signal Vb from the second photo sensitive region 2-2, in the case when the convergent lens is deviated from the position of the focusing state in a direction away from the optical disk, is limited at the maximum value, and the output signal Ve generated from the differential amplifier 4 is limited at its maximum value as shown in FIG. 6. As apparent from the graph in FIG. 7, the integrating value Sa of the output signal Ve in range I is $$Sa = \left| \int_{0}^{\infty} I(Z)dZ \right|,$$

which is smaller than the integrating value Sb of the output signal in range II, where Sb is $$Sb = \left| \int_{0}^{Z1} I(Z)dZ \right|.$$

Thus, the size of the first and second photo sensitive regions 2-1, 2-2 of the photodetector 2 is determined so that the integrating value of the output signal, generated from the differential amplifier 4 while the convergent lens is moved from the position sufficiently separated from the optical disk to the position of the focusing state, becomes smaller than that of the output signal generated from the differential amplifier 4 while the convergent lens is moved sufficiently near the optical disk from the position of the focusing state. Since the photo sensitive regions 2-1, 2-2 respectively have specific sizes, the convergent lens 14 can be prevented from running away. In other words, since the convergent lens 14 is driven, depending substantially upon the level of the output signal Ve, by a driver (not shown), the convergent lens is sufficiently decelerated in range II from the large integrating value even if the lens is accelerated in range I to the small integrating value when the lens is moved toward the optical disk from the position sufficiently separated from the optical disk. As a result, the convergent lens 14 is temporarily stopped before the lens reaches the point Z1 of range II, and starts moving again toward the point Zo of the focusing state. The convergent lens can be effectively prevented from running away by designing the system to close the focus servo loop, so that the convergent lens moves depending upon the output signal from the differential amplifier between the point Z1 and the point Z2 in the focus servo system having the characteristics shown in FIG. 7. In order to design the photodetector having the characteristics shown in FIG. 7, the outer periphery of the photosensitive regions may be covered with a light shielding mask.

In the embodiment described above, the optical system is employed for detecting the state of the convergent lens by detecting the variation in the size of the beam spot on the photo sensitive regions of the photodetector 2. However, the system may not be limited to this particular detecting optical system, but other optical system such as an astigmatism optical system may be adopted.

In the embodiment described above, the photo sensitive regions of the photodetector 2 are located at the rear convergent point, the aperture 18 is located at the front of the convergent point, and both are arranged substantially symmetrically to the convergent point. However, the photo sensitive regions of the photodetector 2 may be located at a suitable position in response to a detecting optical system, the aperture 18 may be located at the reflected laser beam path, and the diameter of the aperture may be determined so that the positive output signal is not generated from the differential amplifier 4 even when the convergent lens excessively approaches the disk surface in response to the located position.

Figure 8:
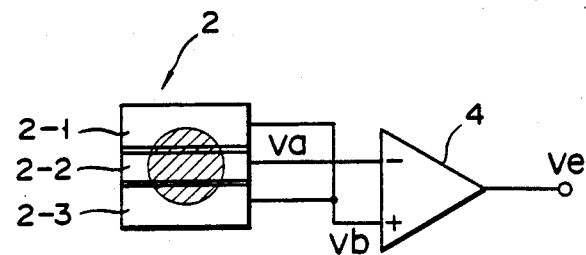
FIG. 8 is a plan view of a photodetector incorporated in an apparatus for detecting a focusing state of an optical system according to the modified embodiment of the present invention.
Figure 9A:
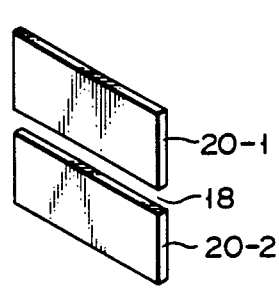
FIG. 9A and FIG. 9B are perspective views showing apertures incorporated in an apparatus for detecting a focusing state of an optical system according to the modified embodiment of the present invention.
Figure 9B:
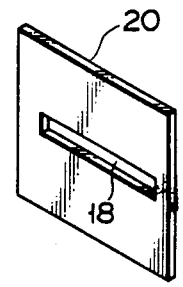
Figure 10:
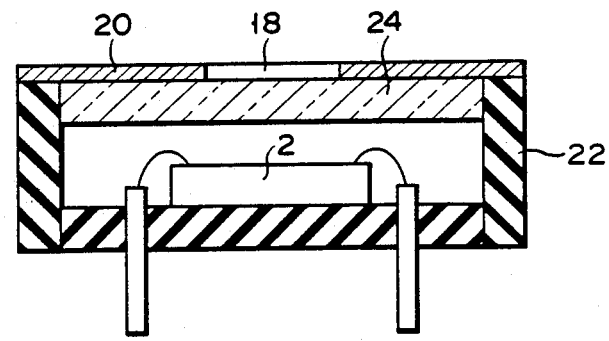
FIG. 10 is a sectional view showing a housing integrated with the aperture and the photodetector.

In the embodiment described above, the photodetector 2 has the first and second photo sensitive regions 2-1 and 2-2 arranged concentrically. However, the regions may not be limited to particular photosensitive regions, but the photodetector 2 shown in FIG. 8 has first, second and third photo sensitive regions 2-1, 2-2 and 2-3 arranged in a band shape, the second photo sensitive region 2-2 may be connected to the inverting input terminal of the differential amplifier 4, and the first and third photo sensitive regions 2-1 and 2-3 may be connected to a non-inverting terminal. As apparent, the photodetector shown in FIG. 8 may be designed to have the characteristics shown in FIG. 7. The aperture 18 may employ the type of rectangular shape shown in FIG. 9A or FIG. 9B corresponding to the photodetector. The aperture 18 shown in FIG. 9A is defined between a pair of plates by arranging a pair of rectangular plates 20-1 and 20-2 in parallel with one another. The aperture 18 shown in FIG. 9B is defined by perforating a rectangular through hole at the plate 20. These apertures 18 may be arranged in parallel with the photo sensitive regions 2-1, 2-2 and 2-3. The apertures 18 shown in FIG. 4, FIG. 9A, and FIG. 9B may be formed integrally with the photodetector 2 as shown in FIG. 10. In other words, a plate 20 having an aperture 18 at a window 24, formed at the opening of a housing 22 containing the photodetector 2, may be extended, or the aperture 18 may be defined by a deposited layer deposited in the window 2. The positional relationship between the photodetector 2 and the aperture 18 is fixedly secured by providing the aperture 18 integrally with the housing 22, thereby eliminating the positional adjustment between both.

What is claimed is:

1. An apparatus for detecting a focusing state of an optical system, comprising:
   means for generating a light beam;
   a convergent lens, movable along its optical axis, for converging the light beam, projecting the converged light beam toward a target surface and converging the light beam reflected from the target surface;
   photodetecting means located at a position deviated from a point on which the reflected converged light beam is converged when said convergent lens is in the focusing state, including first and second photosensitive regions for detecting the beam size of the light beam and converting the light beam into first and second photo signals indicative of the beam size of the reflected light beam hitting the respective first and second photosensitive regions; and
   means provided in the path of the reflected light beam directed from the convergent lens toward the detecting means, including a light beam blocking region and a light beam transmitting region for allowing the light beam to pass through only the light beam transmitting region thereby to define the maximum beam diameter of the reflected light beam, the optical axis of said convergent lens passing through said photodetecting means and the light beam transmitting region.

2. An apparatus for detecting a focusing state of an optical system according to claim 1, further comprising optical means for transmitting the light beam generated from light beam generating means and reflecting the reflected light beam reflected from a target plane toward the photodetecting means.

3. An apparatus for detecting a focusing state of an optical system according to claim 1, wherein the photodetecting means is so located that the photo sensitive regions receive the light beam diverged from a convergent point which is formed by the light beam reflected from the target surface when the convergent lens is in a focusing state.

4. An apparatus for detecting a focusing state of an optical system according to claim 3, wherein said defining means is arranged symmetrically to the detecting means in respect to the convergent point.

5. An apparatus for detecting a focusing state of an optical system according to claim 2, wherein the first and second photo sensitive regions of the detecting means are concentrically arranged.

6. An apparatus for detecting a focusing state of an optical system according to claim 2, wherein the photodetecting means has band-shaped first, second and third photo sensitive regions arranged in parallel with one another.

7. An apparatus for detecting a focusing state of an optical system according to claim 2, wherein said defining means is a light shielding plate having an aperture.

8. An apparatus for detecting a focusing state of an optical system according to claim 1, wherein said defining means is a light shielding plate having a rectangular light transmitting hole.

9. An apparatus for detecting a focusing state of an optical system according to claim 1, wherein the integrating value of a first photo signal, generated from the photodetecting means while the convergent lens is sufficiently away from the target surface to the position of the focusing state, is smaller as compared with that of the second photo signal, generated from the photodecting means while the convergent lens is sufficiently approached from the position of the focusing state to the optical disk.

10. An apparatus for detecting a focusing state of an optical system according to claim 8, wherein the first and second photo sensitive regions of the detecting means are concentrically arranged, and the second photo sensitive region is arranged around the first photo sensitive region and has a diameter not larger than a beam spot diameter $2W_o$, wherein the beam spot diameter $2W_o$ is defined as a diameter of a beam spot which is formed by the light beam on the photo-sensitive regions when the convergent lens is in a focusing state.

11. An apparatus for detecting a focusing state of an optical system according to claim 9, wherein the photo sensitive regions are partly covered with a mask for shielding the light beam.

* * * * *